(12) United States Patent
Hirano et al.

(10) Patent No.: US 9,097,834 B2
(45) Date of Patent: Aug. 4, 2015

(54) OPTICAL FIBER AND OPTICAL FIBER PREFORM

(75) Inventors: Masaaki Hirano, Yokohama (JP);
Tetsuya Haruna, Yokohama (JP);
Yoshiaki Tamura, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 173 days.

(21) Appl. No.: 13/441,978

(22) Filed: Apr. 9, 2012

(65) Prior Publication Data
US 2012/0263427 A1    Oct. 18, 2012

(30) Foreign Application Priority Data
Apr. 15, 2011 (JP) .................................. 2011-091250

(51) Int. Cl.
*G02B 6/02* (2006.01)
*C03B 37/012* (2006.01)
*C03B 37/014* (2006.01)
*C03B 37/018* (2006.01)
*C03B 37/027* (2006.01)
(Continued)

(52) U.S. Cl.
CPC .............. *G02B 6/02* (2013.01); *C03B 37/014* (2013.01); *C03B 37/0124* (2013.01); *C03B 37/01211* (2013.01); *C03B 37/01228* (2013.01); *C03B 37/01807* (2013.01); *C03B 37/01861* (2013.01); *C03B 37/01869* (2013.01); *C03B 37/027* (2013.01); *C03C 13/045* (2013.01); *G02B 6/03611* (2013.01); *C03B 2201/12* (2013.01); *C03B 2201/20* (2013.01); *C03B 2201/50* (2013.01); *C03B 2203/22* (2013.01);
*G02B 6/0365* (2013.01); *G02B 6/03605* (2013.01); *G02B 6/03627* (2013.01); *G02B 6/03633* (2013.01); *G02B 6/03644* (2013.01)

(58) Field of Classification Search
CPC .. G02B 6/02; G02B 6/03605; G02B 6/03611; G02B 6/03616; G02B 6/03644
USPC ................................... 385/126, 127, 142, 144
See application file for complete search history.

(56) References Cited

U.S. PATENT DOCUMENTS

| 3,971,645 | A | 7/1976 | Bachmann et al. |
| 5,146,534 | A | 9/1992 | Lines |

(Continued)

FOREIGN PATENT DOCUMENTS

| JP | 2005-537210 | 12/2005 |
| JP | 2007-504080 | 3/2007 |

(Continued)

*Primary Examiner* — Daniel Petkovsek
(74) *Attorney, Agent, or Firm* — Drinker Biddle & Reath LLP

(57) ABSTRACT

An optical fiber preform has a core portion having a first core portion including a central axis, a second core portion disposed around the first core portion, and a third core portion disposed around the second core portion. The first core portion contains 10 atomic ppm or more of an alkali metal and 10 to 600 atomic ppm of chlorine, the second core portion contains 10 atomic ppm or less of the alkali metal and 10 to 600 atomic ppm of chlorine, and the third core portion contains 10 atomic ppm or less of the alkali metal and 2,000 atomic ppm or more of chlorine. An optical fiber has a core region doped with an alkali metal and chlorine, wherein the minimum concentration of chlorine in the core region is 1,000 atomic ppm or more, and the average concentration of the alkali metal therein is 0.2 atomic ppm or more.

14 Claims, 11 Drawing Sheets

(51) Int. Cl.
*C03C 13/04* (2006.01)
*G02B 6/036* (2006.01)

(56) References Cited

U.S. PATENT DOCUMENTS

| | | | |
|---|---|---|---|
| 6,153,546 | A | 11/2000 | Saitoh et al. |
| 7,088,900 | B1 | 8/2006 | Mishra |
| 7,489,850 | B1 | 2/2009 | Berkey |
| 7,536,076 | B2 * | 5/2009 | Khrapko et al. ............ 385/142 |
| 7,844,155 | B2 * | 11/2010 | Bickham et al. ............ 385/126 |
| 7,929,818 | B1 * | 4/2011 | Bickham et al. ............ 385/124 |
| 8,666,214 | B2 * | 3/2014 | Bookbinder et al. ......... 385/124 |
| 2005/0063663 | A1 * | 3/2005 | Anderson et al. ............ 385/142 |
| 2005/0129376 | A1 | 6/2005 | Hanson et al. |
| 2006/0130530 | A1 | 6/2006 | Anderson et al. |
| 2007/0116418 | A1 * | 5/2007 | Mishra ........................ 385/123 |
| 2008/0279515 | A1 * | 11/2008 | Bickham et al. .............. 385/123 |

FOREIGN PATENT DOCUMENTS

| | | |
|---|---|---|
| JP | 2008-536190 | 9/2008 |
| JP | 2009-541796 | 11/2009 |
| JP | 2010-501894 | 1/2010 |
| JP | 2010-526749 | 8/2010 |
| WO | 98/02389 | 1/1998 |
| WO | 2004/020357 | 3/2004 |
| WO | 2005/021455 | 3/2005 |
| WO | 2005/058765 | 6/2005 |
| WO | 2006/112918 | 10/2006 |
| WO | 2007/149344 | 12/2007 |
| WO | 2008/024255 | 2/2008 |
| WO | 2008/136929 | 11/2008 |

* cited by examiner

OPTICAL FIBER AND OPTICAL FIBER PREFORM

BACKGROUND OF THE INVENTION

1. Field of the Invention

The present invention relates to an optical fiber and an optical fiber preform.

2. Description of the Related Art

An optical fiber composed of silica-based glass and having a core region doped with an alkali metal is known. In the case where a core portion of an optical fiber preform is doped with an alkali metal, it is possible to reduce the viscosity of the core portion during drawing of the optical fiber preform, and relaxation of a network structure of silica glass can be made to enhance. It is believed that, consequently, an attenuation of the resulting optical fiber can be decreased.

Japanese Unexamined Patent Application Publication (Translation of PCT Application) No. 2005-537210 and U.S. Patent Application Publication No. 2006/0130530 disclose a diffusion method as a method of doping silica glass with an alkali metal. In the diffusion method, a glass pipe is heated by an external heat source or plasma is generated in the glass pipe while vapor of a raw material such as an alkali metal element or an alkali metal salt is introduced into the glass pipe, thereby doping an inner surface of the glass pipe with an alkali metal by thermal diffusion.

After the doping into the inner surface of the glass pipe with the alkali metal in this manner, the glass pipe is heated to be shrunk to a certain diameter. After the glass pipe has been shrunk, in order to remove contaminated impurities, such as Ni, Fe, and other transition metals, which were also doped in the glass pipe at the same time as the doping of the alkali metal, the inner surface of the glass pipe is etched by a certain amount in the direction of the wall thickness. The diffusion rates of alkali metals are higher than those of transition metals. Therefore, even when the transition metals are almost perfectly removed by etching the inner surface of the glass pipe by a certain amount in the thickness direction thereof, considerable amount of the doped alkali metal remains in the glass. After the etching, the glass pipe is made to collapse by heating to manufacture an alkali-metal-doped core rod. A cladding portion is synthesized on the outside of the alkali-metal-doped core rod, thus manufacturing an optical fiber preform. Subsequently, the optical fiber preform is drawn to manufacture an optical fiber.

Japanese Unexamined Patent Application Publication (Translation of PCT Application) Nos. 2007-504080, 2008-536190, and 2010-501894 describe that a core region of an optical fiber is substantially composed of pure silica glass, that the chlorine concentration is preferably low in an optical fiber having a core region doped with an alkali metal, and that a pure-silica-core fiber having a germanium-free core region preferably contains substantially no chlorine and the chlorine concentration of the fiber is preferably 500 ppm by weight or less.

Japanese Unexamined Patent Application Publication (Translation of PCT Application) No. 2009-541796 discloses an optical fiber having a core region containing an alkali metal in a concentration of 50 to 500 ppm and chlorine in an average concentration of 500 ppm by weight or more. However, as is apparent from the description of paragraph [0029] and FIG. 2, the chlorine concentration in a first core region that is mainly doped with an alkali metal is as low as 100 ppm by weight or less.

SUMMARY OF THE INVENTION

It is an object of the present invention to provide an optical fiber having a core region doped with an alkali metal, and having a low attenuation and excellent radiation resistance, and an optical fiber preform suitable for manufacturing such an optical fiber by drawing.

An optical fiber according to the present invention includes a core region and a cladding region surrounding the core region, wherein the core region is doped with an alkali metal and chlorine, a minimum concentration of chlorine in the core region is 1,000 atomic ppm (600 ppm by weight) or more, and an average concentration of the alkali metal in the core region is 0.2 atomic ppm or more. Herein, the term "atomic ppm" refers to the number of atoms of the doped material contained in one million $SiO_2$ units.

In the optical fiber, the core region preferably further contains fluorine, and an average concentration of a dopant other than the alkali metal, chlorine, and fluorine in the core region is preferably lower than the sum of an average concentration of chlorine and an average concentration of fluorine in the core region. The average concentration of the alkali metal in the core region is preferably 50 atomic ppm or less. The minimum concentration of chlorine in the core region is preferably 13,000 atomic ppm or less. The core region is preferably doped with potassium as the alkali metal. An average concentration of chlorine in the core region is preferably 2,000 atomic ppm or more. An attenuation of the optical fiber at a wavelength of 1,550 nm is preferably 0.180 dB/km or less.

In the optical fiber according to the present invention, the minimum concentration of chlorine in the core region is preferably 2,000 atomic ppm or more, the average concentration of chlorine in the core region is preferably 4,000 atomic ppm or more and 13,000 atomic ppm or less, the average concentration of the alkali metal in the core region is preferably 0.2 atomic ppm or more and 2 atomic ppm or less, the average concentration of a dopant other than the alkali metal and halogen in the core region is preferably lower than the average concentration of the halogen in the core region, and an attenuation at a wavelength of 1,550 nm is preferably 0.180 dB/km or less.

In the optical fiber according to the present invention, after the optical fiber has been irradiated with gamma rays at a cumulative radiation dose of 2,000 Gy or more and the irradiation of the gamma rays has been terminated, a non-relaxation component of an increase in the attenuation at a wavelength of 1,550 nm is preferably 15 dB/km or less. Herein, the term "non-relaxation component of an increase in the attenuation" refers to a difference between an attenuation after 700 hours and longer from the termination of irradiation of gamma rays and an attenuation before the start of the irradiation of the gamma rays. In the optical fiber according to the present invention, the refractive index preferably takes a minimum refractive index N1 of the core region at a radius r1 smaller than a radius r2 that provides a maximum refractive index N2 of the core region.

An optical fiber preform according to the present invention includes a core portion to be formed in to a core region of an optical fiber and a cladding portion to be formed into a cladding region of the optical fiber, wherein the core portion has at least a first core portion including a central axis, a second core portion disposed in contact with the outer circumference of the first core portion, and a third core portion disposed in contact with the outer circumference of the second core portion, the first core portion contains an alkali metal in a concentration of 10 atomic ppm or more and chlorine in a concentration of 10 to 600 atomic ppm, the second core portion contains the alkali metal in a concentration of 10 atomic ppm or less and chlorine in a concentration of 10 to 600 atomic ppm, and the third core portion contains the alkali metal in a concentration of 10 atomic ppm or less and chlorine in a concentration of 2,000 atomic ppm or more.

In the optical fiber preform, an average concentration of the alkali metal in the core portion is preferably 1,000 atomic ppm or less. A fluorine concentration in the third core portion is preferably 200 atomic ppm or less. In the optical fiber preform, the refractive index preferably takes a minimum refractive index N1 of the core portion at a radius r1 smaller than a radius r2 that provides a maximum refractive index N2 of the core portion.

According to the optical fiber of the present invention, a core region is doped with an alkali metal and thus a low attenuation can be achieved, and at the same time, excellent radiation resistance can also be achieved.

DESCRIPTION OF THE PREFERRED EMBODIMENTS

Figure 1:
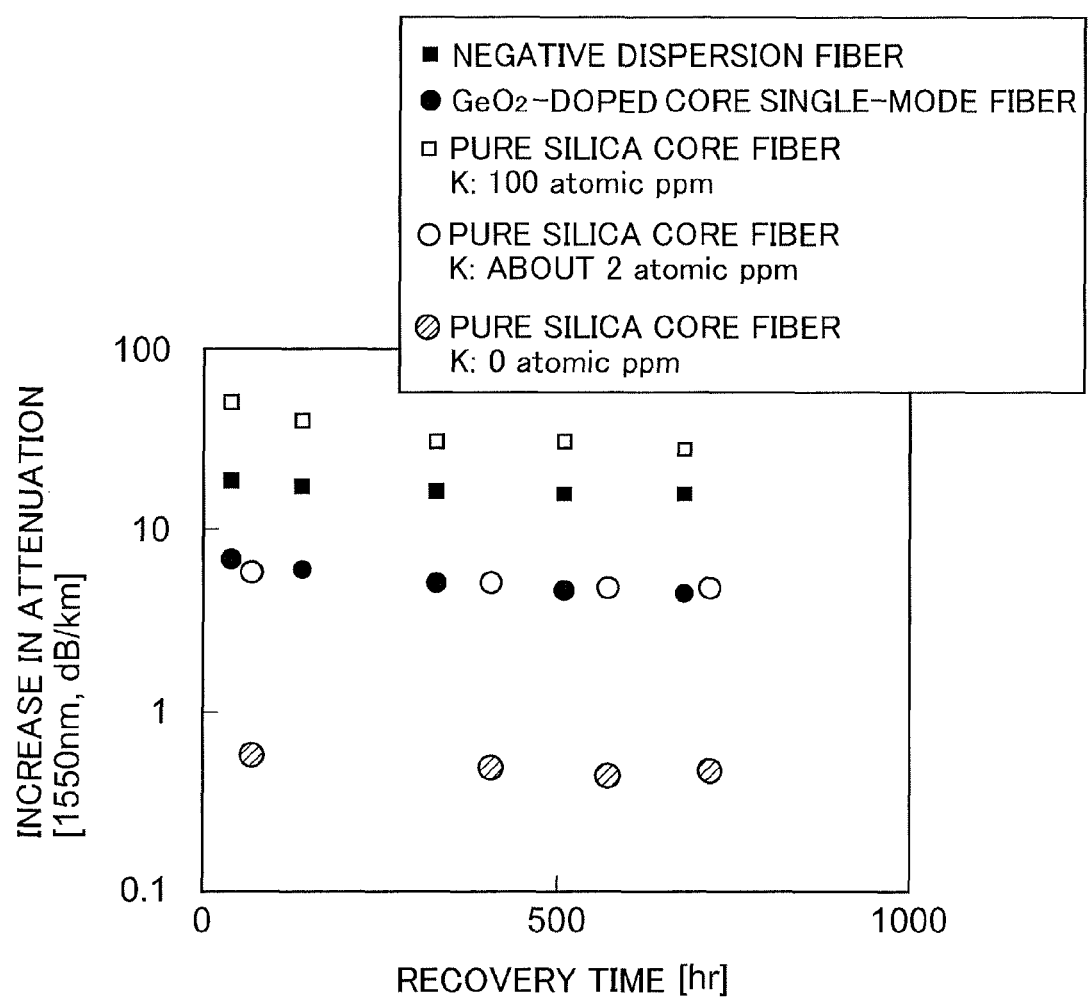
FIG. 1 is a graph showing the relationship between the time (recovery time) elapsed from the termination of irradiation of gamma-rays and the amount of increase in attenuation of optical fibers at a wavelength of 1,550 nm.

Embodiments of the present invention will now be described with reference to the drawings. The drawings are illustrative only, and do not limit the scope of the invention. In the drawings, the identical symbols indicate the same portions in order to avoid overlapping of description. The proportions of dimensions in the drawings are not necessarily accurate.

When an alkali metal in silica glass is irradiated with high-energy radiation such as gamma rays, the alkali metal will be able to transfer in the glass and causes defects in the glass network structure. Accordingly, when silica glass is doped with a high concentration of an alkali metal, the environmental resistance characteristics of the silica glass are degraded. In actual manufacturing of optical fibers, in the case where the concentration of an alkali metal is low to the extent that no problem in terms of environmental resistance characteristics occurs, the attenuation may be increased, resulting in a problem of a low yield of optical fibers.

First, the upper limit of the concentration of an alkali metal in a core region of an optical fiber will be described. Low-attenuation optical fibers are used for ultra-long distance transmission, e.g., submarine cables. When the average concentration of an alkali metal in a core region of such a low-attenuation optical fiber is higher than 50 atomic ppm, radiation resistance, which is an important environmental resistance characteristic especially for submarine cables, is significantly degraded. In order to confirm this phenomenon, optical fibers containing an alkali metal were irradiated with gamma rays from a radiation source of cobalt-60 in a cumulative dose of 2,000 Gy, the irradiation of the gamma rays was then terminated, and the amount of increase in the attenuation as compared with the attenuation before the start of the irradiation was measured.

FIG. 1 is a graph showing the relationship between the time (recovery time) elapsed from the termination of gamma-ray irradiation of pure silica core fibers, a $GeO_2$-doped core negative dispersion fiber, and a $GeO_2$-doped core single-mode fiber and the amount of increase in attenuation at a wavelength of 1,550 nm. The concentration of the alkali metal in each of the optical fibers was measured by secondary ion mass spectrometry (SIMS). Regarding the amount of alkali metal in the optical fiber denoted by the open circles in the figure, it is believed that about 2 atomic ppm of potassium is contained, though the concentration may be inaccurate because the measurement lower limit of SIMS is about 1 ppm. As shown in FIG. 1, the higher the concentration of potassium serving as an alkali metal, the larger the increase in the attenuation caused by the gamma ray irradiation.

Figure 2:
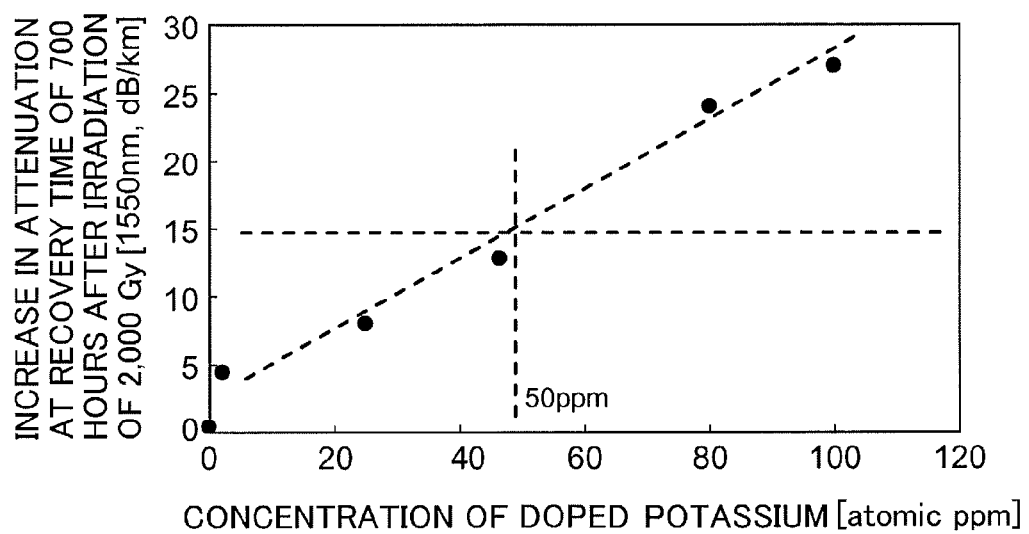
FIG. 2 is a graph showing the relationship between the concentration of potassium doped to a $GeO_2$-free core region of the pure silica core fiber and a non-relaxation component of an increase in attenuation of the fiber.

Currently, negative dispersion fibers (doped with about 20 ppm by weight of $GeO_2$) have been practically used as optical fibers for submarine cables. In such a negative dispersion fiber, the amount of increase in the attenuation after the irradiation of cumulative dose of 2,000 Gy and at a recovery time of 700 hours (i.e., a non-relaxation component of an increase in the attenuation by gamma-ray irradiation) is about 15 dB/km, and this value is believed to be one standard of radiation resistance. FIG. 2 is a graph showing the relationship between the concentration of potassium doped to a $GeO_2$-free core region in a pure silica core fiber and the non-relaxation component at a wavelength of 1,550 nm after an irradiation of a cumulative dose of 2,000 Gy of gamma rays of the fiber. In order to suppress the non-relaxation component of an increase in the attenuation to be 15 dB/km or less, it is necessary to control the average concentration of the alkali metal in the core region of the optical fiber to be 50 atomic ppm or less. Furthermore, the average concentration of the alkali metal in the core region of the optical fiber is more preferably 2 atomic ppm or less so as to realize radiation resistance substantially equal to that of the standard single-mode optical fiber having a core region doped with $GeO_2$.

In addition, in the case where the average concentration of the alkali metal in the core region is 50 atomic ppm or less, problems regarding reliability such as hydrogen resistance, a strength characteristic of the optical fiber, etc. do not occur. For example, regarding hydrogen resistance, the following results were obtained. Optical fibers were treated at a hydrogen partial pressure of 1 atm (101 kPa) at a temperature of 80° C. for 20 hours. After this hydrogen treatment, the increase in the attenuation caused by absorption of a hydroxyl (OH)

group in a wavelength band of 1.38 μm was 0.0 to 0.15 dB/km. The increase in the attenuation was 0.10 dB/km or less in 97% of the optical fibers, and 0.05 dB/km or less in 50% of the optical fibers. A significant increase in the attenuation did not occur in the wavelength range of 1,530 to 1,610 nm in all the optical fibers, and thus satisfactory results were obtained. Furthermore, a hydrogen treatment was performed at a hydrogen partial pressure of 0.1 atm at a temperature of 40° C. for three months. During this hydrogen treatment, no abnormal attenuation peak was observed in the wavelength range of 1,420 to 1,610 nm. Regarding the strength characteristic, both a static fatigue coefficient (Ns) and a dynamic fatigue coefficient (Nd), which are generally known as parameters indicating a failure probability of an optical fiber, were in the range of 18 to 27 and thus satisfactory results were obtained.

Figure 3:
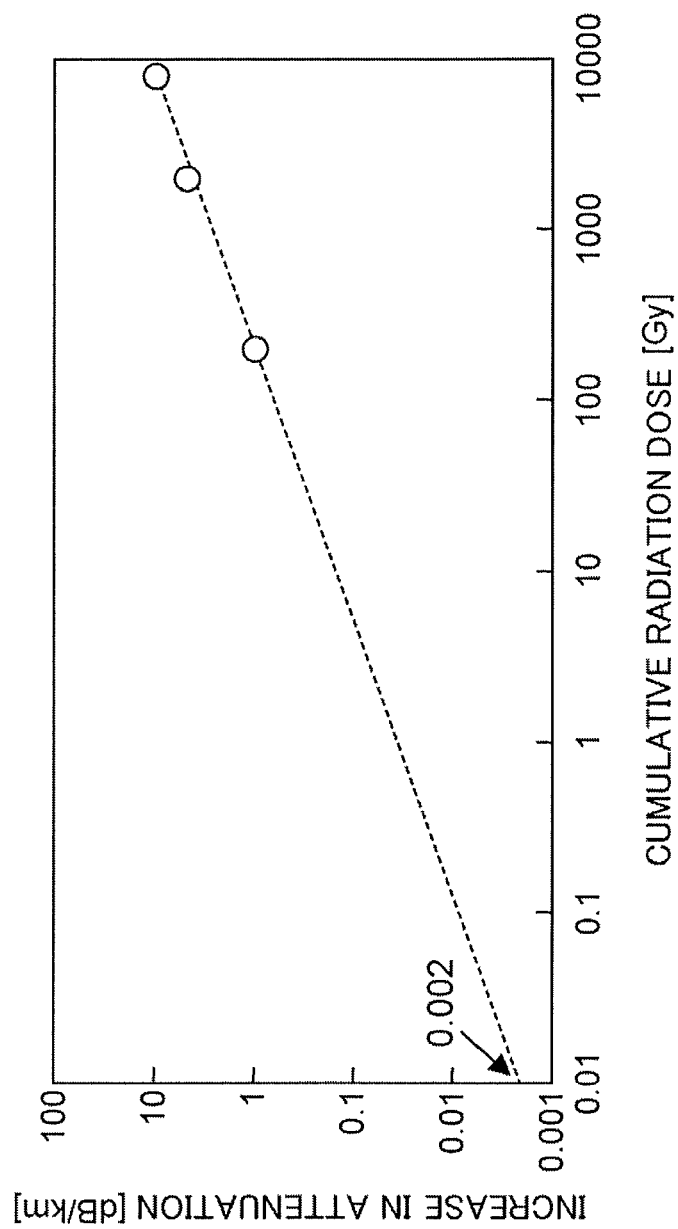
FIG. 3 is a graph showing the relationship between the cumulative radiation dose and a non-relaxation component of an increase in attenuation.

FIG. 3 is a graph showing the relationship between the cumulative radiation dose and the non-relaxation component of an increase in the attenuation at a wavelength of 1,550 nm of an optical fiber, which is a pure silica core fiber having a core doped with potassium in an average concentration of about 2 atomic ppm. With an increase in the cumulative radiation dose, the non-relaxation component increases. It is estimated that an optical fiber that is actually laid as a submarine cable receives a cumulative radiation dose of about 0.01 Gy for a period of about 20 years, and that the increase in the attenuation in this case is preferably 0.005 dB/km or less. Regarding an optical fiber having a core doped with potassium in an average concentration of about 2 atomic ppm, when the optical fiber receives a cumulative radiation dose of 0.01 Gy, the amount of increase in the attenuation at a wavelength of 1,550 nm is estimated to be 0.002 dB/km or less by extrapolating the relationship between the cumulative radiation dose and the non-relaxation component. However, in the case where the concentration of an alkali metal in a core region of an optical fiber is lower than that (50 to 500 ppm) of the optical fiber described in the above related art document, the attenuation of the optical fiber may not be decreased.

Next, an effect of doping chlorine to an optical fiber will be described. The related art document describes that codoping of an alkali metal and chlorine in silica-based glass should be avoided because an alkali chloride is produced and thus the silica-based glass is crystallized. However, the inventor of the present invention found the following: Regarding an optical fiber preform, the presence of an alkali chloride should be avoided because the alkali chloride may cause crystallization and formation of air bubbles. In contrast, regarding an optical fiber, when a core region of the optical fiber contains 1,000 atomic ppm or more of chlorine, the attenuation is decreased. Specifically, the inventor of the present invention found that the chlorine concentration should be low in an optical fiber preform, whereas the chlorine concentration should be high in an optical fiber.

The inventor of the present invention found that it is desirable to start from an optical fiber preform having a core portion including, from the center, a first core portion, a second core portion, and a third core portion in that order, wherein, in the first core portion, the alkali metal concentration is high and the chlorine concentration is low, in the third core portion, the alkali metal is not substantially contained and the chlorine concentration is high, and in the second core portion located between the first core portion and the third core portion, both the alkali metal concentration and the chlorine concentration are low, and to draw the optical fiber preform under appropriate conditions. Regarding the drawing conditions, for example, the drawing speed (take-up speed for the optical fiber) may be set to 1,000 to 3,000 m/min, the drawing tension (tension applied to the glass portion of an optical fiber) may be set to 30 to 150 gf (0.3 to 1.5 N), and the time spent in a drawing apparatus in the form of an optical fiber having a glass diameter of 200 μm or less may be set to 0.01 to 0.3 seconds. The diameter of the optical fiber preform may be 70 to 180 mm, and the diameter of the glass portion of the optical fiber may be 100 to 150 μm.

Figure 4A:
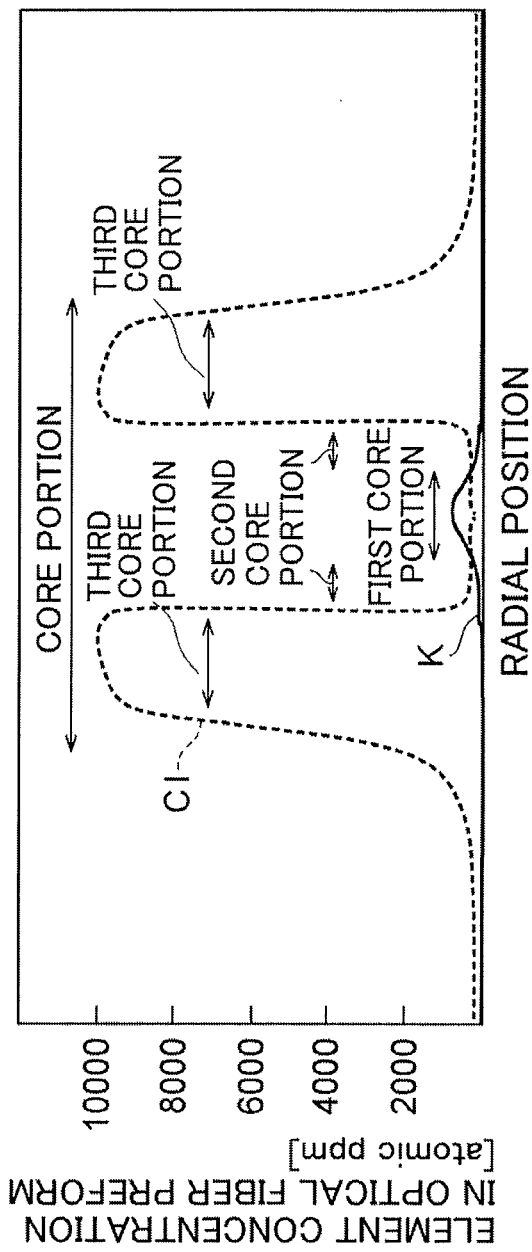
FIG. 4A is a conceptual view showing distributions of the potassium concentration and the chlorine concentration in the radial direction near a core portion of an optical fiber preform.

FIG. 4A is a conceptual view showing distributions of the potassium concentration (solid line) and the chlorine concentration (broken line) in the radial direction near a core portion of an optical fiber preform. In this example, the core portion of the optical fiber preform was doped with potassium as an alkali metal so that the maximum concentration of potassium was about 800 atomic ppm and the average concentration of potassium in the core portion was about 10 atomic ppm. Regarding the conditions for drawing this optical fiber preform, the drawing speed was set to 1,300 m/min, the drawing tension was set to 70 gf, and the time spent in a drawing apparatus in the form of a fiber having a glass diameter of 200 μm or less was set to about 0.05 seconds.

Figure 4B:
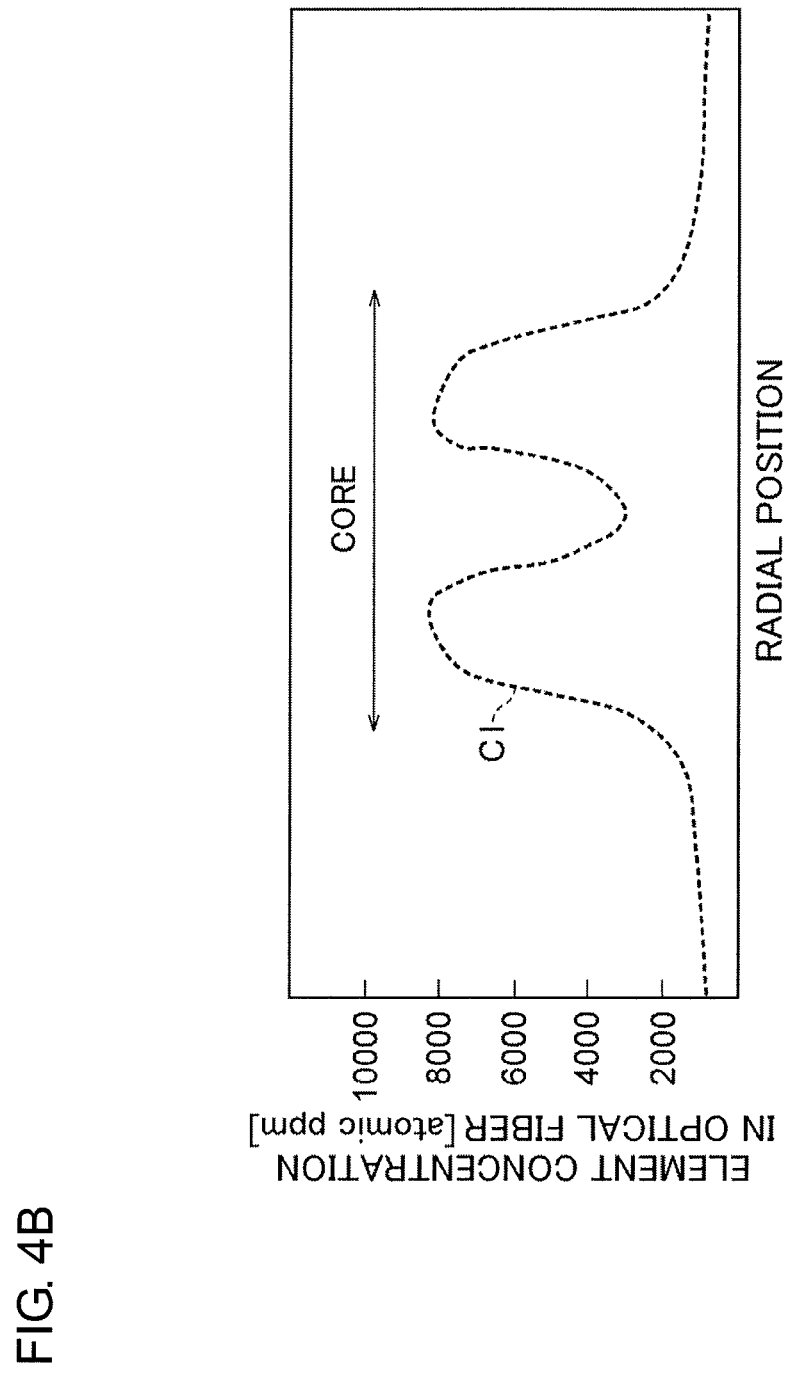
FIG. 4B is a conceptual view showing a distribution of the chlorine concentration in the radial direction near a core region of an optical fiber manufactured by drawing the optical fiber preform.

FIG. 4B is a conceptual view showing a distribution of the chlorine concentration in the radial direction near a core region of an optical fiber manufactured by drawing the optical fiber preform in FIG. 4A. In this optical fiber, potassium diffused from the first core portion, and potassium could not be detected with SIMS over the entire area of a cross section of the optical fiber. Thus, the potassium concentration was decreased to 10 atomic ppm or less. This optical fiber was a single-mode fiber at a wavelength of 1,550 nm. In this optical fiber, the minimum concentration of chlorine in the core region was 3,000 atomic ppm, the average concentration of chlorine over the entire core region was 7,000 atomic ppm, and the attenuation at a wavelength of 1,550 nm was 0.163 dB/km. On the other hand, as a comparative example, an optical fiber having substantially the same potassium concentration as that of the optical fiber in FIG. 4B was manufactured under the same conditions. In this comparative example, in the case where the minimum concentration of chlorine over the entire core region was set to 100 atomic ppm, and the average concentration thereof was set to 300 atomic ppm, the attenuation was very high, i.e., 0.215 dB/km.

A reason in the decrease in attenuation is supposed to be as follows. In the case where no alkali metal is present, there was no significant difference in the distribution of the chlorine concentration between an optical fiber preform and the resulting optical fiber. In contrast, in the optical fiber (FIG. 4B) manufactured by drawing the optical fiber preform in FIG. 4A, the chlorine concentration near the center of the core increased to several thousand atomic ppm, showing that chlorine in an amount 100 times or more of the alkali metal transferred. Accordingly, it is believed that, although glass defects may be formed by thermal diffusion of a small amount of alkali metal during drawing process and may cause an increase in attenuation, the glass defects are repaired by diffused chlorine elements, and thus the increase in attenuation can be suppressed. In addition, since an optical fiber has a small diameter, the cooling rate after heating in a drawing step is very high. Therefore, even when an alkali metal salt is present, the silica-based glass may not crystallize significantly. This is also believed to be a factor in the decrease in attenuation.

Figure 5:
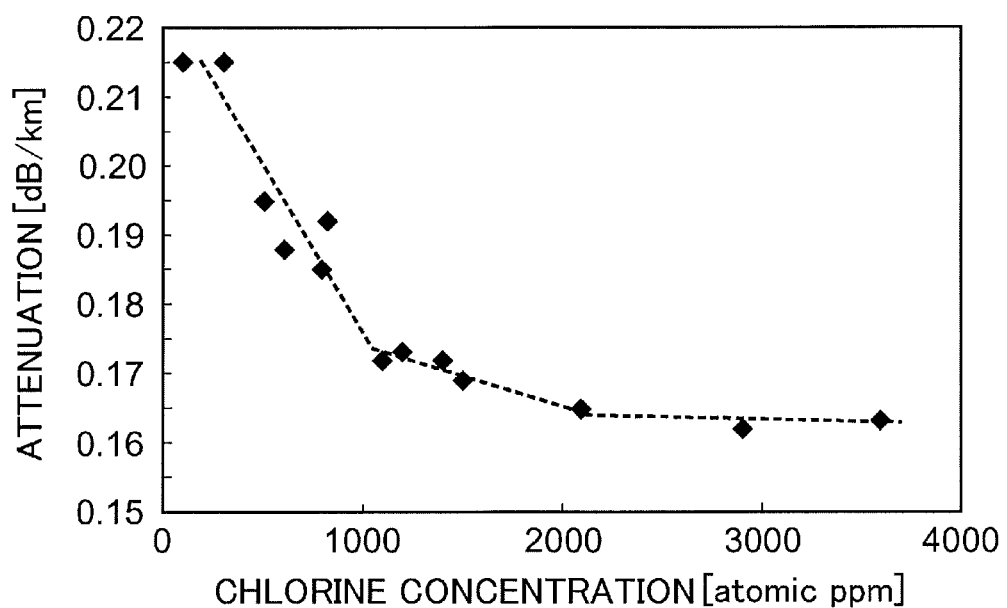
FIG. 5 is a graph showing the relationship between the minimum value of the chlorine concentration in a core region of an optical fiber and the attenuation at a wavelength of 1,550 nm.

Next, conditions of the concentration of doped chlorine will be described. FIG. 5 is a graph showing the relationship between the minimum value of the chlorine concentration in a core region of an optical fiber and the attenuation at a wavelength of 1,550 nm. The chlorine concentration in the core region in the optical fiber was measured with electron probe microanalysis (EPMA). In this example, a core portion of an optical fiber preform was doped with potassium as an alkali metal in a maximum concentration of about 1,000 atomic ppm and an average concentration of about 20 atomic ppm in the core portion. Regarding the conditions for drawing the optical fiber preform, the drawing speed was set to 1,700 m/min, the drawing tension was set to 50 gf, and the time spent in a drawing apparatus in the form of an optical fiber having a glass diameter of 200 μm or less was set to about 0.04 seconds.

The potassium concentration in the core region of the optical fiber manufactured by drawing the above optical fiber preform was estimated to be about 1 atomic ppm on average. However, potassium could not be detected over the entire area of a cross section of the optical fiber by the measurement with SIMS. The optical fiber was a single-mode fiber at a wavelength of 1,550 nm.

As is apparent from FIG. 5, when the chlorine concentration is 1,000 atomic ppm or less, the attenuation of the optical fiber tends to drastically increase. Thus, the minimum concentration of chlorine in the core region of the optical fiber is preferably 1,000 atomic ppm or more. The minimum concentration of chlorine in the core region of the optical fiber is more preferably 2,000 atomic ppm or more because a low attenuation can be stably realized at a chlorine concentration of 2,000 atomic ppm or more.

As shown in FIGS. 4A and 4B, the chlorine concentration in the optical fiber preform is very low near the central portion of the core portion, whereas the chlorine concentration in the optical fiber is the lowest near the central portion of the core region and is high at the outer peripheral portion of the core region. The average concentration of chlorine in the entire core region becomes twice or more than the minimum concentration thereof. Accordingly, the average concentration of chlorine in the core region of the optical fiber is preferably 2,000 atomic ppm or more, and more preferably 4,000 atomic ppm or more.

Next, the lower limit of the concentration of doped potassium will be described. An optical fiber preform has a core portion doped with an alkali metal and having a diameter of about several millimeters. In a step (drawing step) of drawing the optical fiber preform is heated at 1,800° C. or higher to manufacture an optical fiber having a core region having a diameter of about several micrometers, thus the alkali metal diffuses in a significant distance. The diffusion distance of the alkali metal in the drawing step is determined on the basis of the heating temperature of the optical fiber preform, the drawing speed in the drawing step, the apparatus used in the drawing step, e.g., a furnace length, and other drawing conditions. It was found that when drawing is performed under the conditions of a drawing speed of 1,000 to 3,000 m/min, a drawing tension of 50 to 150 gf, and a time spent in a drawing apparatus in the form of a fiber having a glass diameter of 200 μm or less of 0.01 to 0.3 seconds, an alkali metal present only in the core portion in the optical fiber preform widely diffuses to a cladding portion, for example, diffuses over a range of about 30 μm in diameter in an optical fiber having a core diameter of 8 μm, and the average concentration of the alkali metal in the core region of the optical fiber is reduced to about 1/20 of the average concentration in the optical fiber preform.

Furthermore, it was found that the attenuation of an optical fiber decreases even when the average concentration of an alkali metal is low to the extent that the average concentration cannot be measured by a currently used measurement method, such as SIMS, EPMA, or inductively coupled plasma-mass spectrometry (ICP-MS), which has a lower limit of detection of about 1 ppm. It was also found that even when the average concentration of an alkali metal in a core potion of an optical fiber preform is about 5 atomic ppm, the attenuation at a wavelength of 1.55 μm can be significantly decreased to 0.175 dB/km or less as long as the minimum value of the chlorine concentration in the resulting optical fiber is 1,500 atomic ppm or more.

If it is supposed that the concentration of the alkali metal in the core region of the optical fiber is reduced to about 1/20 of the concentration in the optical fiber preform as described above, the average concentration of the alkali metal in the core region of the optical fiber is preferably 0.2 atomic ppm or more. More preferably, the average concentration of the alkali metal in the core portion of the optical fiber preform is about 10 atomic ppm, and the average concentration of the alkali metal in the core region of the optical fiber is 0.5 atomic ppm or more because the attenuation of the optical fiber at a wavelength of 1,550 nm can be decreased to 0.165 dB/km or less.

On the other hand, since the average concentration of the alkali metal in the core region of the optical fiber is preferably 50 atomic ppm or less, as described above, the average concentration of the alkali metal in the core portion of the optical fiber preform is preferably about 1,000 atomic ppm or less. Also, since the average concentration of the alkali metal in the core region of the optical fiber is more preferably 2 atomic ppm or less, as described above, the average concentration of the alkali metal in the core portion of the optical fiber preform is more preferably about 40 atomic ppm or less.

Next, the structure of the optical fiber preform according to this embodiment, and a method of manufacturing an optical fiber according to this embodiment will be described. If an alkali metal salt is produced in the optical fiber preform, cristobalite and air bubbles tend to be generated. To prevent this problem, the optical fiber preform preferably has a first core portion having a low chlorine concentration in an area doped with a high concentration of an alkali metal. In order to increase the chlorine concentration in the entire core portion, the optical fiber preform preferably has a third core portion that is not substantially doped with the alkali metal and that is doped with a high concentration of chlorine, the third core portion being disposed in an outer peripheral portion of the first core portion. Furthermore, in order to suppress the generation of an alkali metal salt due to a mutual diffusion between the alkali metal and chlorine in a step of manufacturing the preform, the optical fiber preform preferably has a second core portion having a low concentration of the alkali metal and a low concentration of chlorine, the second core portion being disposed between the first core portion and the third core portion.

More specifically, a core portion of the optical fiber preform preferably has, from the center, a first core portion, a second core portion, and a third core portion in that order, wherein the first core portion contains an alkali metal in a concentration of 10 atomic ppm or more and chlorine in a concentration of 10 to 600 atomic ppm, the second core portion contains the alkali metal in a concentration of 10 atomic ppm or less and chlorine in a concentration of 10 to 600 atomic ppm, and the third core portion contains the alkali metal in a concentration of 10 atomic ppm or less and chlorine in a concentration of 2,000 atomic ppm or more.

The chlorine concentration in each of the first core portion and the second core portion is more preferably 10 to 200 atomic ppm. Each of the first core portion and the second core portion may be doped with 3,000 to 15,000 atomic ppm of fluorine. Preferably, the third core portion has a fluorine concentration of 200 atomic ppm or less and substantially does not contain fluorine in order to keep the refractive index of the core portion high. The core portion may further contain other halogen and oxygen molecules.

The core portion preferably does not substantially contain transition metals such as Fe, Ni, and Cu, and the average concentration of the transition metals in the entire core portion is preferably 10 ppb or less. Similarly, the concentration of an OH group in the core portion is preferably low, specifically, 100 ppb or less. Preferably, the core portion does not contain, for example, Ge or P, and the average concentration of a dopant other than the alkali metal and the halogen is preferably lower than the average concentration of the halogen in the core portion. A cladding portion has a refractive index lower than that of the third core portion and is preferably composed of silica-based glass doped with fluorine.

Figure 6:
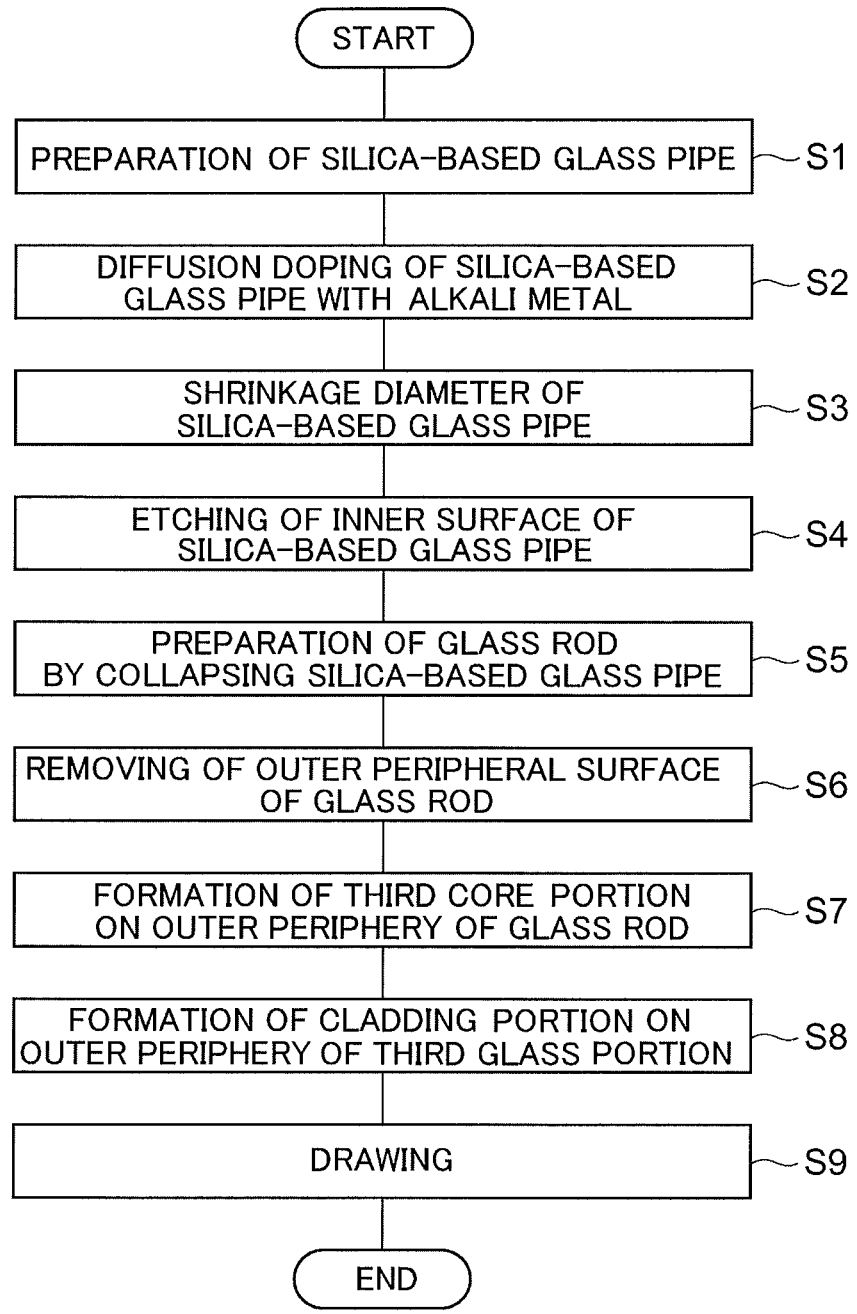
FIG. 6 is a flowchart for explaining an example of a method of manufacturing an optical fiber according to an embodiment of the present invention.

FIG. 6 is a flowchart for explaining an example of a method of manufacturing an optical fiber according to an embodiment of the present invention. An optical fiber preform having a first core portion, a second core portion, a third core portion, and a cladding portion, and an optical fiber can be manufactured by sequentially performing steps S1 to S9.

In step S1, a silica-based glass pipe is prepared. The chlorine concentration of this glass pipe is preferably 600 atomic ppm or less, and preferably 100 atomic ppm or less so as not to produce an alkali metal salt in an optical fiber preform.

Figure 7:
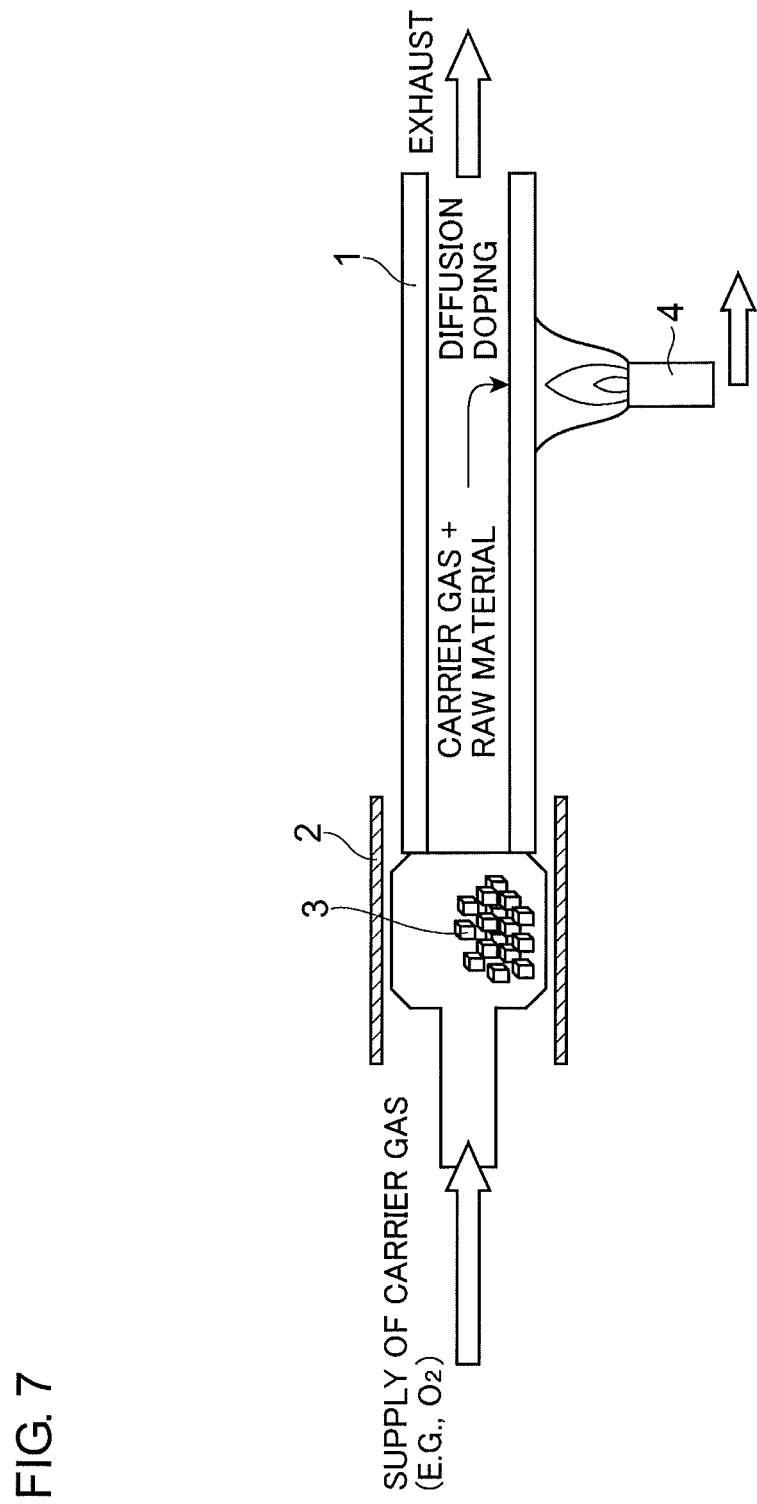
FIG. 7 is a schematic view illustrating an alkali-metal-doping step in a method of manufacturing an optical fiber preform.

In step S2, an inner surface of the glass pipe is doped with an alkali metal by thermal diffusion. FIG. 7 is a conceptual view illustrating an alkali-metal-doping step in the method of manufacturing an optical fiber preform. Gas of a raw material 3 for an alkali metal heated by a heat source (such as an electric furnace or a burner) 2 is supplied to the inside of a glass pipe 1 together with a carrier gas (such as $O_2$ gas, Ar gas, or He gas) supplied from a supply source (not shown). At the same time, the glass pipe 1 is heated by an external heat source (such as a thermal plasma or an oxyhydrogen flame) 4. Thus, the glass pipe 1 is doped with the alkali metal by thermal diffusion from the inner surface thereof.

In step S3, the diameter of the glass pipe is shrunk by heating the glass pipe. In step S4, the inner surface of the glass pipe is etched so as to remove impurities such as Ni, Fe, other transition metals, and OH groups, which are also doped to the glass pipe at the same time as the doping of the alkali metal. In step S5, the glass pipe is collapsed to prepare a glass rod. A central portion of this glass rod functions as a first core portion. In step S6, the outer peripheral surface of the glass rod is ground by a certain amount to remove impurities such as transition metals and OH groups. Consequently, the peripheral portion of the glass rod functions as a second core portion in which the alkali metal concentration and the chlorine concentration are low.

In step S7, a third core portion is formed on the outer periphery of the glass rod to prepare a core glass rod. The third core portion is formed by synthesizing silica-based glass doped with a high concentration, i.e., 2,000 atomic ppm or more of chlorine. In step S8, a cladding portion is formed on the outer periphery of the third core portion of the core glass rod to manufacture an optical fiber preform. This cladding portion is composed of silica glass having a refractive index lower than that of the third core portion.

When the outer diameter of the first core portion of the optical fiber preform is represented by D1, the outer diameter of the second core portion is represented by D2, and the outer diameter of the third core portion is represented by D3, a ratio D3/D1 is preferably in the range of 2 to 10, and a ratio D2/D1 is preferably in the range of 1.1 to 6. The maximum value of the relative refractive index difference $$\Delta n = \frac{n - n_{cladding}}{n_{cladding}}$$

in the third core portion relative to the minimum refractive index $n_{cladding}$ of the cladding portion is preferably in the range of 0.15% to 1.0%.

Regarding an optical fiber preform having the above-described distributions of the chlorine concentration and the fluorine concentration in the radial direction, a refractive index near the central axis of the core portion is low, and a refractive index in the outer periphery of the central portion is high. Specifically, the refractive index takes a minimum refractive index N1 at a radius r1 smaller than a radius r2 that provides a maximum refractive index N2 of the core portion.

Figure 8:
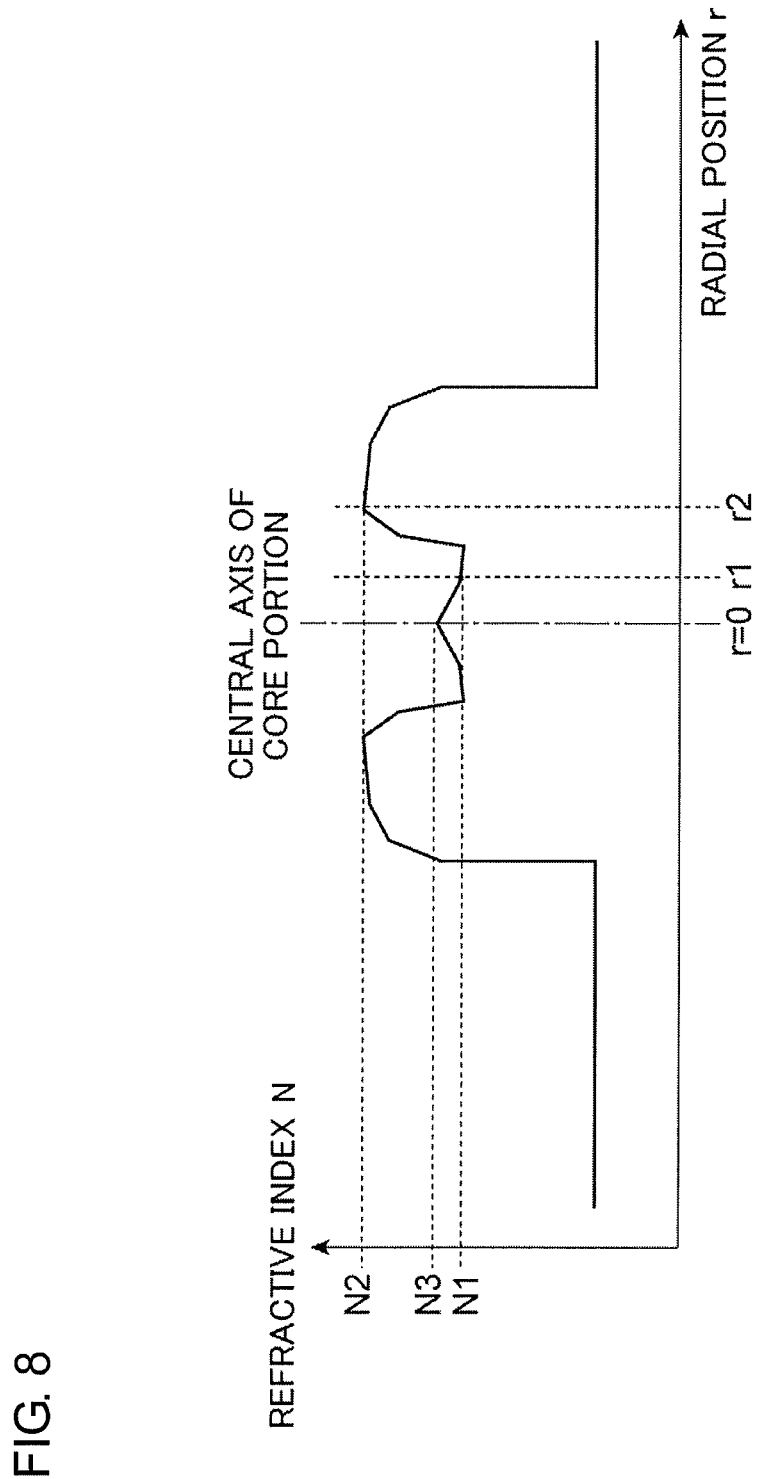
FIG. 8 is a graph showing an example of a refractive index profile of an optical fiber preform.

In doping with an alkali metal by thermal diffusion, if the silica-based glass pipe contains fluoride and has lower refractive index than that of a pure silica glass, the alkali metal and fluorine react with each other to generate an alkali fluoride. This alkali fluoride is desorbed from the inner surface of the glass pipe, which may result in an increase in the refractive index of the inner surface of the glass pipe. Accordingly, in the glass rod obtained by collapsing this glass pipe, the glass rod being doped with the alkali metal, the refractive index near the central portion may be higher than the minimum value. Specifically, when the refractive index at the central axis (r=0) of the core portion of the optical fiber preform is represented by N3, the relationship N1<N3<N2 may be satisfied (refer to FIG. 8).

In step S9, an optical fiber is manufactured by drawing the optical fiber preform. The refractive index distribution of the optical fiber in the radial direction is changed from the refractive index distribution of the optical fiber preform by thermal diffusion of chlorine and fluorine in a heating step such as a drawing step and depending on the distribution of a residual stress in the optical fiber. However, as in the optical fiber preform, regarding the refractive index distribution of the optical fiber, the refractive index takes a minimum refractive index N1 at a radius r1 smaller than a radius r2 that provides a maximum refractive index N2 of the core region. In addition, when the refractive index at the central axis (r=0) of the core region is represented by N3, the relationship N1<N3<N2 may be satisfied.

Figure 9:
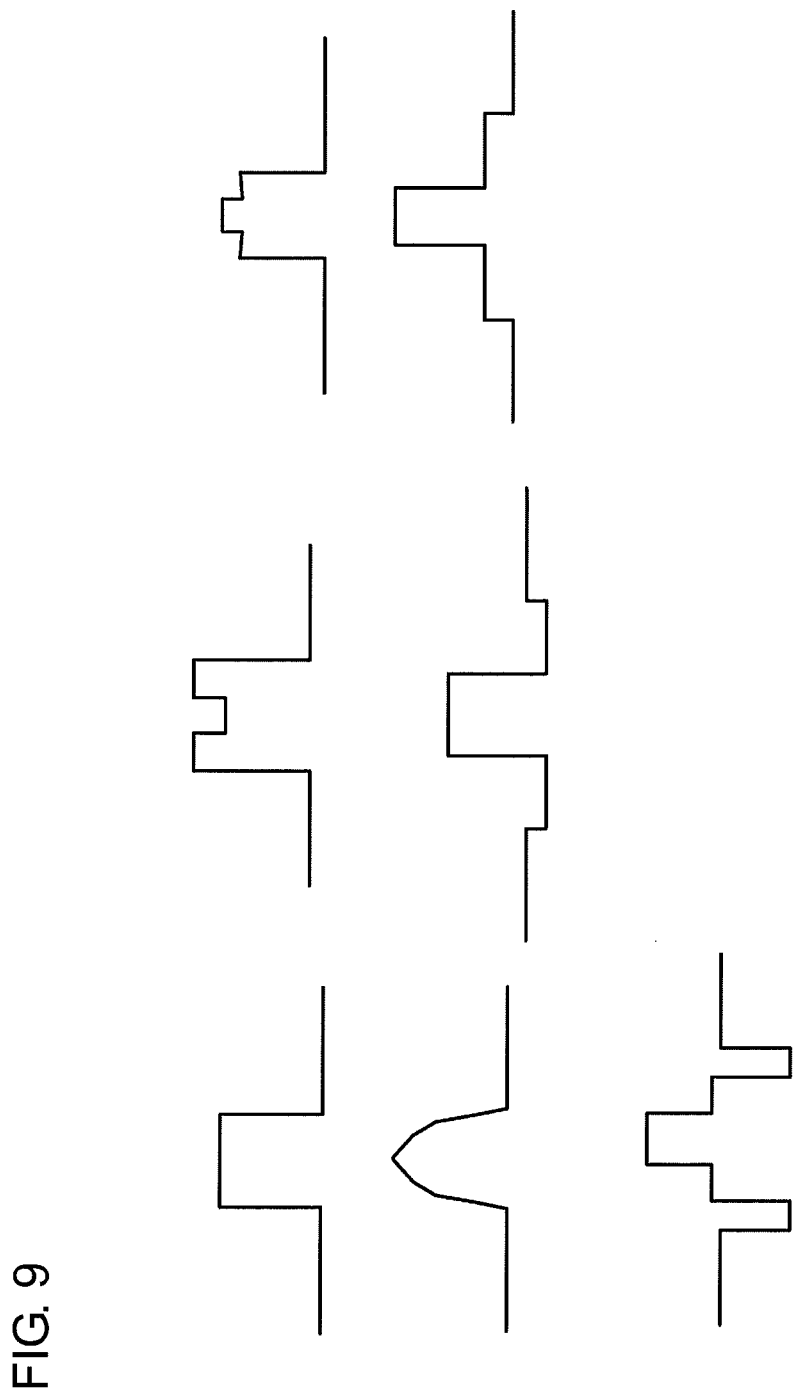
FIG. 9 includes graphs showing other examples of a refractive index profile of an optical fiber preform.
Figure 10:
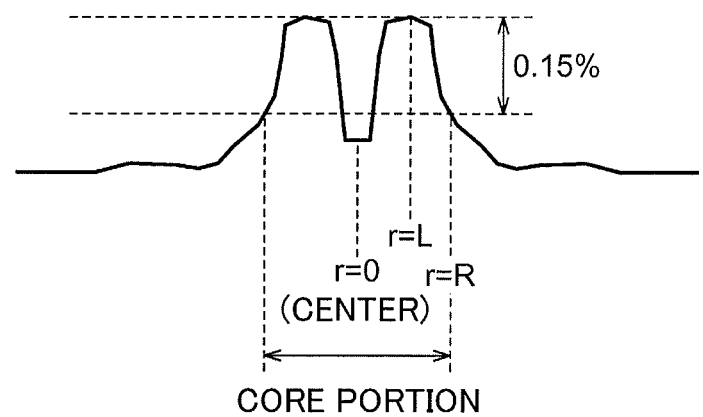
FIG. 10 is a graph showing a refractive index profile of an optical fiber preform.

Herein, the optical fiber preform may be an intermediate product of an optical fiber preform, and silica-based glass may be further synthesized on the outer periphery of the intermediate product. Each of the core portion and the cladding portion of the optical fiber preform may have a radial distribution of the refractive index. For example, each of the core portion and the cladding portion may have any of the refractive index profiles illustrated in FIG. 9, but the refractive index profile is not limited thereto. Note that, in the refractive index profile of an optical fiber preform illustrated in FIG. 10, the refractive index at a position spaced away from a central axis of the optical fiber preform by a distance r in the radial direction is represented by N(r). It is assumed that the refractive index N(L) becomes the maximum value $N_{max}$ at a position L in the radial direction. In addition, it is assumed that, at a position R in the radial direction where |L|<|R|, $(N_{max}-N(R))/N_{max}$ is 0.15%. The region within the radius R in this case is defined as the core portion.

The attenuation of the optical fiber at a wavelength of 1,550 nm is preferably low. Specifically, the attenuation at a wavelength of 1,550 nm is preferably 0.180 dB/km or less, more preferably, 0.170 dB/km or less, and still more preferably 0.160 dB/km or less. The effective area may be about 70 to 160 μm² at a wavelength of 1,550 nm. The chromatic dispersion at a wavelength of 1,550 nm may be +15 to +22 ps/nm/km. The attenuation at a wavelength of 1,380 nm is preferably low. Specifically, the attenuation at a wavelength of 1,380 nm is preferably 0.8 dB/km or less, more preferably, 0.4 dB/km or less, and most preferably 0.3 dB/km or less. The polarization mode dispersion at a wavelength of 1,550 nm may be 0.2 ps/√km or less. The cable cut-off wavelength is preferably 1,520 nm or less, and more preferably 1,450 nm, which is a pump wavelength used in Raman amplification, or less. The diameter of the core portion is about 5 to 15 μm. The relative refractive index difference between the core portion and the cladding portion:

$$\frac{\text{(refractive index of core portion)} - \text{(refractive index of cladding portion)}}{\text{refractive index of core portion}}$$

is about 0.1% to 0.7%.

EXAMPLE 1

In Example 1, an optical fiber preform and an optical fiber were manufactured by sequentially performing the processes of steps S1 to S9 in FIG. 6, and transmission characteristics of the optical fiber were evaluated.

A glass pipe prepared in step S1 was composed of silica-based glass containing 100 atomic ppm of chlorine and 6,000 atomic ppm of fluorine as dopants, and the concentration of other impurities in the glass pipe was 10 ppm or less. Thus, the glass pipe was substantially composed of pure silica glass. The outer diameter of this glass pipe was 35 mm, and the inner diameter thereof was about 20 mm.

In step S2, potassium bromide (KBr) was used as a raw material for an alkali metal, and this raw material was heated to a temperature of 840° C. by a heat source to generate KBr vapor. The glass pipe was then heated by a thermal plasma flame serving as an external heat source so that the temperature of the outer surface of the glass pipe became 2,050° C. while the KBr vapor was introduced into the glass pipe together with oxygen introduced as a carrier gas at a flow rate of 1 SLM (1 liter/min in terms of the standard state). Heating was performed by causing the thermal plasma flame to traverse at a rate of 30 mm/min for 20 turns. Thus, the inner surface of the glass pipe was doped with potassium by thermal diffusion.

In step S3, the glass pipe doped with potassium was heated by a thermal plasma flame serving as an external heat source so that the temperature of the outer surface of the glass pipe became 2,100° C. while oxygen (2 SLM) was supplied through the glass pipe. Heating was performed by causing the thermal plasma flame to traverse at a rate of 40 mm/min for 6 turns. The inner diameter of the glass pipe doped with potassium was reduced to 3 mm.

In step S4, gas-phase etching was performed by heating the glass pipe doped with potassium by an external heat source while $SF_6$ (0.05 SLM) and oxygen (1 SLM) were introduced into the glass pipe. Thus, the inner diameter of the glass pipe was made to be 3.4 mm.

In step S5, the absolute pressure in the glass pipe was reduced to 1 kPa while oxygen (1 SLM) was introduced into the glass pipe, and the glass pipe was made to collapse by increasing the surface temperature of the glass pipe to 1,400° C. by an external heat source. Thus, an alkali-metal-doped core glass rod having a diameter of 28 mm was obtained. The maximum potassium concentration of this alkali-metal-doped core glass rod was 1,800 atomic ppm. A region (first core portion) doped with 10 atomic ppm or more of potassium had a diameter of 12 mm.

In step S6, the alkali-metal-doped core glass rod was elongated by a known method so as to have a diameter of 20 mm. The outer peripheral portion of the alkali-metal-doped core glass rod was then ground so that the diameter of the glass rod was reduced to 12 mm. In the resulting core glass rod, a ratio D2/D1 of the outer diameter (D2) of a second core portion in which both the alkali metal concentration and the chlorine concentration were low to the diameter (D1) of the first core portion doped with the alkali metal was 1.4.

In step S7, silica-based glass (third core portion glass) doped with 10,000 atomic ppm of chlorine was provided on the outside of the alkali-metal-doped core glass rod to prepare a core glass rod having an outer diameter of 60 mm. The alkali-metal-doped core glass and the outer core glass constitute a core portion of an optical fiber preform. The alkali metal concentration of this core portion was 30 atomic ppm on average. The synthesis of this third core portion was performed by a known rod-in-collapse method in which a silica-based glass pipe doped with 10,000 atomic ppm of chlorine was prepared, the alkali-metal-doped core glass rod was inserted into the glass pipe, and the glass pipe and the alkali-metal-doped core glass rod were heated and integrated with each other by an external heat source. In the resulting core glass rod, a ratio D3/D1 of the outer diameter (D3) of the third core portion doped with a high concentration of chlorine to the diameter (D1) of the first core portion doped with the alkali metal was 7.0.

In step S8, silica-based glass (optical cladding glass portion) doped with fluorine was synthesized on the outside of the resulting core glass rod. The relative refractive index difference between the third core portion and the optical cladding portion was about 0.35% at the maximum. The synthesis of this optical cladding glass portion was performed by a known rod-in-collapse method in which a silica-based glass pipe doped with 27,000 atomic ppm of fluorine was prepared, the core glass rod was inserted into the glass pipe, and the glass pipe and the core glass rod were heated and integrated with each other by an external heat source.

Furthermore, the glass rod having the optical cladding was subjected to elongation or the like so as to have a predetermined diameter. Silica-based glass (physical cladding glass portion) doped with fluorine was then synthesized on the outside of the glass rod to prepare an optical fiber preform having a diameter of 140 mm. The relative refractive index difference between the third core portion and the physical cladding portion was about 0.33% at the maximum. The synthesis of this physical cladding glass portion was performed by a known soot method (vapor-phase axial deposition (VAD) method in this example).

In step S9, the optical fiber preform was drawn to manufacture an optical fiber. In this step, the drawing speed was 2,300 m/min, the drawing tension was 50 gf, and the time spent in a drawing apparatus in the form of a fiber having a glass diameter of 200 μm or less was 0.02 seconds. Characteristics of the optical fiber manufactured as described above are shown in Table. An optical fiber having a low attenuation was obtained.

TABLE

|  |  | Example 1 | Example 2 |
|---|---|---|---|
| Minimum value of chlorine concentration | atomic ppm | 2,800 | 3,300 |
| Concentration of potassium doped (average in core) | atomic ppm | about 2 | 1 or less |
| Attenuation (wavelength: 1,300 nm) | dB/km | 0.285 | 0.290 |
| Attenuation (wavelength: 1,380 nm) | dB/km | 0.283 | 0.320 |

TABLE-continued

|  | | Example 1 | Example 2 |
|---|---|---|---|
| Attenuation (wavelength: 1,550 nm) | dB/km | 0.160 | 0.161 |
| Chromatic dispersion (wavelength: 1,550 nm) | ps/nm/km | +15.9 | +20.9 |
| Dispersion slope (wavelength: 1,550 nm) | ps/nm$^2$/km | +0.054 | +0.060 |
| Zero-dispersion wavelength | nm | 1,310 | |
| Dispersion slope at zero-dispersion wavelength | ps/nm$^2$/km | +0.083 | |
| Effective area (wavelength: 1,550 nm) | μm$^2$ | 82 | 140 |
| Mode field diameter (wavelength: 1,550 nm) | μm | 10.3 | 12.7 |
| Mode field diameter (wavelength: 1,310 nm) | μm | 9.1 | |
| Fiber cut-off wavelength (2 m) | nm | 1,310 | 1,590 |
| Cable cut-off wavelength (22 m) | nm | 1,230 | 1,490 |
| Polarization mode dispersion (C- and L-bands) | ps/√km | 0.11 | 0.01 |
| Nonlinear coefficient (wavelength: 1,550 nm, random polarization state) | (W · km)$^{-1}$ | 1.1 | 0.6 |

EXAMPLE 2

In Example 2, an optical fiber preform and an optical fiber were manufactured by sequentially performing the processes of steps S1 to S9 in FIG. 6, and transmission characteristics of the optical fiber were evaluated.

A glass pipe prepared in step S1 was composed of silica-based glass containing 50 atomic ppm of chlorine and 7,000 atomic ppm of fluorine as dopants, and the concentration of other impurities in the glass pipe was 10 ppm or less. Thus, the glass pipe was substantially composed of pure silica glass. The outer diameter of this glass pipe was 25 mm, and the inner diameter thereof was about 10 mm.

In step S2, potassium bromide (KBr) was used as a raw material for an alkali metal, and this raw material was heated to a temperature of 800° C. by a heat source to generate KBr vapor. The glass pipe was then heated by an oxyhydrogen flame serving as an external heat source so that the temperature of the outer surface of the glass pipe became 2,050° C. while the KBr vapor was introduced into the glass pipe together with oxygen introduced as a carrier gas at a flow rate of 1 SLM. Heating was performed by causing the oxyhydrogen flame to traverse at a rate of 30 mm/min for 15 turns. Thus, the inner surface of the glass pipe was doped with potassium by thermal diffusion.

In step S3, the glass pipe doped with potassium was heated by a oxyhydrogen flame serving as an external heat source so that the temperature of the outer surface of the glass pipe became 2,100° C. while oxygen (2 SLM) was supplied through the glass pipe. Heating was performed by causing the oxyhydrogen flame to traverse at a rate of 40 mm/min for 8 turns. The inner diameter of the glass pipe doped with potassium was reduced to 3 mm.

In step S4, gas-phase etching was performed by heating the glass pipe doped with potassium by an external heat source while SF$_6$ (0.05 SLM) and oxygen (1 SLM) were introduced into the glass pipe. Thus, the inner diameter of the glass pipe was made to be 3.3 mm.

In step S5, the absolute pressure in the glass pipe was reduced to 1 kPa while oxygen (1 SLM) was introduced into the glass pipe, and the glass pipe was made to collapse by increasing the surface temperature of the glass pipe to 1,400° C. by an external heat source. Thus, an alkali-metal-doped core glass rod having a diameter of 22 mm was obtained. The maximum potassium concentration of this alkali-metal-doped core glass rod was 1,300 atomic ppm. A region (first core portion) doped with 10 atomic ppm or more of potassium had a diameter of 7 mm.

In step S6, the alkali-metal-doped core glass rod was elongated by a known method so as to have a diameter of 16 mm. The outer peripheral portion of the alkali-metal-doped core glass rod was then ground so that the diameter of the glass rod was reduced to 10 mm. In the resulting core glass rod, a ratio D2/D1 of the outer diameter (D2) of a second core portion in which both the alkali metal concentration and the chlorine concentration were low to the diameter (D1) of the first core portion doped with the alkali metal was 2.0.

In step S7, silica-based glass (third core portion glass) doped with 13,000 atomic ppm of chlorine was provided on the outside of the alkali-metal-doped core glass rod to prepare a core glass rod having an outer diameter of 30 mm. The alkali-metal-doped core glass and the outer core glass constitute a core portion of an optical fiber preform. The alkali metal concentration of this core portion was 10 atomic ppm on average. The synthesis of this third core portion was performed by a known rod-in-collapse method in which a silica-based glass pipe doped with 13,000 atomic ppm of chlorine was prepared, the alkali-metal-doped core glass rod was inserted into the glass pipe, and the glass pipe and the alkali-metal-doped core glass rod were heated and integrated with each other by an external heat source. In the resulting core glass rod, a ratio D3/D1 of the outer diameter (D3) of the third core portion doped with a high concentration of chlorine to the diameter (D1) of the first core portion doped with the alkali metal was 5.9.

In step S8, silica-based glass (optical cladding glass portion) doped with fluorine was synthesized on the outside of the resulting core glass rod. The relative refractive index difference between the third core portion and the optical cladding portion was about 0.29% at the maximum. Furthermore, the glass rod having the optical cladding was subjected to elongation or the like so as to have a predetermined diameter. Silica-based glass (physical cladding glass portion) doped with fluorine was then synthesized on the outside of the glass rod to prepare an optical fiber preform having a diameter of 90 mm. The relative refractive index difference between the third core portion and the physical cladding portion was about 0.23% at the maximum.

In step S9, the optical fiber preform was drawn to manufacture an optical fiber. In this step, the drawing speed was 1,000 m/min, the drawing tension was 50 gf, and the time spent in a drawing apparatus in the form of a fiber having a glass diameter of 200 μm or less was 0.05 seconds.

Characteristics of the optical fiber manufactured as described above are shown in Table above. An optical fiber having a low attenuation was obtained.

What is claimed is:
1. An optical fiber comprising:
a core region including a center axis of the optical fiber and having a refractive index $n_{core}$, the core region contain- ing an alkali metal in an average concentration of 0.2 atomic ppm or more and chlorine having a concentration of 1,000 atomic ppm or more in the entire core region; and a cladding region surrounding the core region and having a refractive index $n_{cladding}$ lower than $n_{core}$.

2. The optical fiber according to claim 1,
wherein the average concentration of the alkali metal in the core region is 50 atomic ppm or less.

3. The optical fiber according to claim 1,
wherein an average concentration of chlorine in the core region is 13,000 atomic ppm or less.

4. The optical fiber according to claim 1,
wherein the core region is doped with potassium as the alkali metal.

5. The optical fiber according to claim 1,
wherein an average concentration of chlorine in the core region is 2,000 atomic ppm or more.

6. The optical fiber according to claim 1,
wherein the refractive index $n_{core}$ takes a minimum refractive index N1 of the core region at a radius r1 smaller than a radius r2 that provides a maximum refractive index N2 of the core region.

7. The optical fiber according to claim 1,
wherein an attenuation at a wavelength of 1,550 nm is 0.180 dB/km or less.

8. The optical fiber according to claim 7,
wherein after the optical fiber has been irradiated with gamma rays at a cumulative radiation dose of 2,000 Gy or more and the irradiation of the gamma rays has been terminated, a non-relaxation component of an increase in the attenuation at a wavelength of 1,550 nm is 15 dB/km or less.

9. The optical fiber according to claim 1,
wherein the core region further contains fluorine, and
an average concentration of any other dopant than the alkali metal, chlorine, and fluorine in the core region is lower than the sum of an average concentration of chlorine and an average concentration of fluorine in the core region.

10. The optical fiber according to claim 9,
wherein an attenuation at a wavelength of 1,550 nm is 0.180 dB/km or less.

11. The optical fiber according to claim 10,
wherein after the optical fiber has been irradiated with gamma rays at a cumulative radiation dose of 2,000 Gy or more and the irradiation of the gamma rays has been terminated, a non-relaxation component of an increase in the attenuation at a wavelength of 1,550 nm is 15 dB/km or less.

12. The optical fiber according to claim 9,
wherein the minimum concentration of chlorine in the core region is 2,000 atomic ppm or more,
the average concentration of chlorine in the core region is 4,000 atomic ppm or more and 13,000 atomic ppm or less,
the average concentration of the alkali metal in the core region is 0.2 atomic ppm or more and 2 atomic ppm or less,
the average concentration of a dopant other than the alkali metal and halogen in the core region is lower than the average concentration of the halogen in the core region, and
an attenuation at a wavelength of 1,550 nm is 0.180 dB/km or less.

13. The optical fiber according to claim 12,
wherein after the optical fiber has been irradiated with gamma rays at a cumulative radiation dose of 2,000 Gy or more and the irradiation of the gamma rays has been terminated, a non-relaxation component of an increase in the attenuation at a wavelength of 1,550 nm is 15 dB/km or less.

14. The optical fiber according to claim 1,
wherein a minimum concentration of chlorine in the core region is 2,000 atomic ppm or more.

\* \* \* \* \*